US012153742B2

(12) United States Patent
Ge et al.

(10) Patent No.: US 12,153,742 B2
(45) Date of Patent: Nov. 26, 2024

(54) TOUCH GENERATOR, OPTICAL TOUCH SYSTEM, AND TOUCH METHOD

(71) Applicant: TCL China Star Optoelectronics Technology Co., Ltd., Shenzhen (CN)

(72) Inventors: Ru Ge, Shenzhen (CN); Fen Long, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/614,550

(22) PCT Filed: Oct. 27, 2021

(86) PCT No.: PCT/CN2021/126723
§ 371 (c)(1),
(2) Date: Nov. 28, 2021

(87) PCT Pub. No.: WO2023/060650
PCT Pub. Date: Apr. 20, 2023

(65) Prior Publication Data
US 2024/0028138 A1    Jan. 25, 2024

(30) Foreign Application Priority Data
Oct. 13, 2021   (CN) .......................... 202111190450.8

(51) Int. Cl.
*G06F 3/0354* (2013.01)
*G06F 3/038* (2013.01)
*G06F 3/042* (2006.01)

(52) U.S. Cl.
CPC ........ *G06F 3/03542* (2013.01); *G06F 3/0383* (2013.01); *G06F 3/042* (2013.01)

(58) Field of Classification Search
CPC .... G06F 3/03542; G06F 3/0383; G06F 3/042; G06F 3/0421; G06F 3/03545;
(Continued)

(56) References Cited

U.S. PATENT DOCUMENTS

| 2013/0100070 A1 | 4/2013 | Zheng et al. |
| 2013/0257812 A1 | 10/2013 | Wang et al. |
| 2020/0103987 A1 | 4/2020 | Li et al. |

FOREIGN PATENT DOCUMENTS

| CN | 102520810 A | 6/2012 |
| CN | 107704113 A | 2/2018 |

(Continued)

OTHER PUBLICATIONS

Chinese Office Action issued in corresponding Chinese Patent Application No. 202111190450.8 dated Jul. 15, 2023, pp. 1-8.
(Continued)

*Primary Examiner* — Abhishek Sarma
(74) *Attorney, Agent, or Firm* — Nathan & Associates; Menachem Nathan

(57) ABSTRACT

Embodiments of the present disclosure discloses a touch generator, an optical touch system, and a touch method. A force condition of a forced member is detected by a pressure detecting unit. When the forced member touches a display panel, the pressure detecting unit detects the force condition of the forced member and sends a control signal, a light-emitting unit receives the control signal and generates light, and the light emits to the display panel from the forced member, which can prevent false touch, simplify operation, and decrease a difficulty of using the touch generator.

3 Claims, 6 Drawing Sheets

(58) Field of Classification Search
CPC .. G06F 3/0386; G06F 3/0414; G06F 3/04162; G06F 3/0416; G06F 2203/04105
See application file for complete search history.

(56) References Cited

FOREIGN PATENT DOCUMENTS

| | | |
|---|---|---|
| CN | 108062179 A | 5/2018 |
| CN | 109240522 A | 1/2019 |
| CN | 110968208 A | 4/2020 |
| CN | 112596622 A | 4/2021 |
| CN | 113126788 A | 7/2021 |
| JP | 2013003997 A | 1/2013 |
| JP | 2015022456 A | 2/2015 |
| JP | 2016018465 A | 2/2016 |
| JP | 2017016567 A | 1/2017 |
| KR | 20090087999 A | 8/2009 |
| KR | 20210081873 A | 7/2021 |

OTHER PUBLICATIONS

Korean Office Action issued in corresponding Korean Patent Application No. 10-2021-7039155 dated Jul. 13, 2023, pp. 1-8.
International Search Report in International application No. PCT/CN2021/126723, mailed on Jun. 24, 2022.
Written Opinion of the International Search Authority in International application No. PCT/CN2021/126723, mailed on Jun. 24, 2022.

TOUCH GENERATOR, OPTICAL TOUCH SYSTEM, AND TOUCH METHOD

BACKGROUND OF DISCLOSURE

Field of Disclosure

The present disclosure relates to a field of touch technology, in particular to a touch generator, an optical touch system, and a touch method.

Description of the Related Art

With development of display technologies, display devices with interactive functions are receiving more and more attention. For example, a display screen having touch function can not only display an image but also feeding back a person's wishes to the screen in time. When optical touch display technology is used for close touch, a false touch phenomenon may occur. For example, when a light stylus is used for writing or painting, if the light stylus continues to emit light, an unnecessary touch trace may appear on the screen when a touch position of the light stylus is adjusted, resulting in unclear handwriting or picture. If the light stylus is controlled to emit light through a switch, it becomes more difficult to use, complicated to operate, and inconvenient to write or draw.

SUMMARY OF DISCLOSURE

Embodiments of the present disclosure provide a touch generator, an optical touch system, and a touch method, which can solve technical problems that a light stylus is prone to false touch and complicated to operate when used in close touch.

An embodiment of the present disclosure provides a touch generator, wherein the touch generator comprises:
   a body;
   a forced member connected to the body;
   a pressure detecting unit for detecting a pressure of the forced member and sending a control signal; and
   a light-emitting unit disposed in the body and electrically connected to the pressure detecting unit, wherein the light-emitting unit is configured to receive the control signal and generate light, and the light is emitted through the forced member.

Alternatively, in some embodiments of the present disclosure, the touch generator further comprises a light guide member disposed in the body, the forced member is provided with a light outlet, and the light guide member is located between the light-emitting unit and the light outlet.

Alternatively, in some embodiments of the present disclosure, the touch generator further comprises a lens disposed between the light guide member and the light outlet.

Alternatively, in some embodiments of the present disclosure, the lens is disposed in the forced member; and
   the touch generator further comprises an elastic member disposed in the body, one end of the elastic member is connected to the body, and another end of the elastic member is connected to the forced member.

Alternatively, in some embodiments of the present disclosure, the body is provided with a first fixed step, the forced member is provided with a second fixed step, one end of the elastic member abuts against the first fixed step, and another end of the elastic member abuts against the second fixed step.

Alternatively, in some embodiments of the present disclosure, both the first fixed step and the second fixed step are annular.

Alternatively, in some embodiments of the present disclosure, the touch generator further comprises a communication module electrically connected to the pressure detecting unit, and the communication module is communicatively connected to an external device.

Alternatively, in some embodiments of the present disclosure, the touch generator further comprises a mechanical switch electrically connected to the light-emitting unit for remaining the light-emitting unit in a light-emitting state or in a turned-off state.

Alternatively, in some embodiments of the present disclosure, the touch generator further comprises a power supply module disposed in the body, and the power supply module is configured to provide power to the touch generator.

An embodiment of the present disclosure further provides an optical touch system, wherein the optical touch system comprises the touch generator according to claim 1 for generating light and a display panel provided with a photosensitive unit for sensing the light generated by the touch generator.

Alternatively, in some embodiments of the present disclosure, the photosensitive unit comprises a plurality of photosensitive elements distributed in an array.

An embodiment of the present disclosure further provides a touch method, wherein the touch method comprises following steps:
   controlling a photosensitive unit to convert light into an electrical signal when receiving the light;
   controlling a micro-control module to parse out a touch data when receiving the electrical signal;
   controlling a display panel to display a touch operation corresponding to the light according to the touch data.

Alternatively, in some embodiments of the present disclosure, the photosensitive unit comprises a plurality of photosensitive elements; and
   the step of controlling the photosensitive unit to convert the light into the electrical signal when receiving the light comprises controlling one or more of the photosensitive elements to convert the light into the electrical signal when receiving corresponding light.

Alternatively, in some embodiments of the present disclosure, the step of controlling the micro-control module to parse out the touch data when receiving the electrical signal comprises:
   calculating coordinates of the photosensitive element receiving the light; and
   obtaining the touch data according to the coordinates of the photosensitive element receiving the light.

Alternatively, in some embodiments of the present disclosure, the touch data comprises a touch position, and the step of obtaining the touch data according to the coordinates of the photosensitive element receiving the light comprises:
   calculating the touch position according to the coordinates of the photosensitive element receiving the light.

Alternatively, in some embodiments of the present disclosure, the touch data further comprises a pressure sensitivity level, and the step of obtaining the touch data according to the coordinates of the photosensitive element receiving the light further comprises:
   calculating a spot area according to the coordinates of the photosensitive element receiving the light; and
   calculating the pressure sensitivity level according to the spot area.

Alternatively, in some embodiments of the present disclosure, the step of controlling the micro-control module to parse out the touch data when receiving the electrical signal comprises:

calculating the coordinates of the photosensitive element receiving the light and acquiring an intensity of the light received by the photosensitive element; and obtaining the touch data in combination with the coordinates of the photosensitive element receiving the light and the intensity of the light received by the photosensitive element.

Alternatively, in some embodiments of the present disclosure, the touch data comprises the touch position, and the step of obtaining the touch data in combination with the coordinates of the photosensitive element receiving the light and the intensity of the light received by the photosensitive element comprises:

calculating, based on the coordinates of the photosensitive element receiving the light and the intensity of the light received by the photosensitive element, a position corresponding to light having a highest intensity, thereby obtaining the touch position; or comparing intensities of light received by the plurality of the photosensitive elements, wherein coordinates of the plurality of photosensitive elements corresponding to the light having the highest intensity is the touch position.

Alternatively, in some embodiments of the present disclosure, the touch position further comprises a pressure sensitivity level, and the step of obtaining the touch data in combination with the coordinates of the photosensitive element receiving the light and the intensity of the light received by the photosensitive element further comprises:

calculating the pressure sensitivity level according to the light having the highest intensity.

Alternatively, in some embodiments of the present disclosure, the step of controlling the micro-control module to parse out the touch data when receiving the electrical signal comprises the micro-control module parsing out the touch data when receiving the electrical signal and an encoded signal of the pressure.

Embodiments of the present disclosure discloses a touch generator, an optical touch system, and a touch method. A force condition of the forced member is detected by the pressure detecting unit. When the forced member touches a display panel, the pressure detecting unit detects the force condition of the forced member and emits the control signal, the light-emitting unit receives the control signal and generates the light, and the light emits to the display panel from the forced member, which can prevent false touch, simplify operation, and decrease a difficulty of using the touch generator.

BRIEF DESCRIPTION OF THE DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Figure 1:
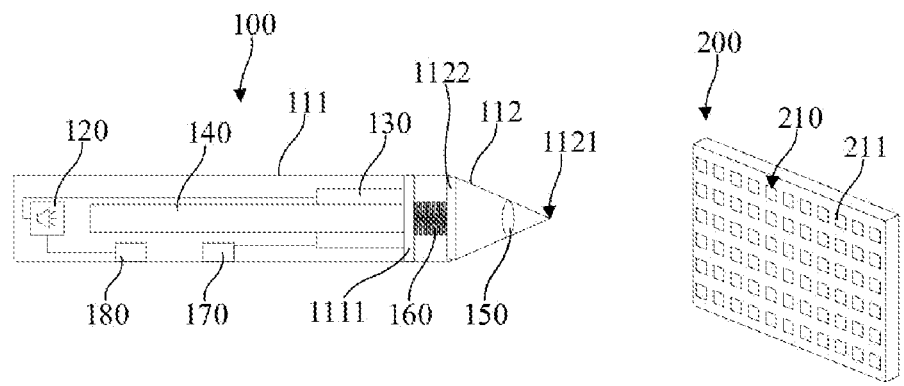
FIG. 1 is a schematic structural diagram of an optical touch system according to an embodiment of the present disclosure.

Technical solutions in the embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure. In addition, it should be understood that specific implementations described here are only used to illustrate and explain the present disclosure, and are not used to limit the present disclosure. In the present disclosure, unless otherwise stated, directional words used such as "upper" and "lower" generally refer to upper and lower directions of a device in actual use or working state, and specifically refer to drawing directions in the drawings. In addition, "inner" and "outer" refer to an outline of the device.

Embodiments of the present disclosure provide a touch generator, an optical touch system, and a touch method. Detailed description will be given below. It should be noted that an order of description of the following embodiments is not a limitation on a preferred order of the embodiments.

Referring to FIG. 1, an embodiment of the present disclosure provides a touch generator 100 comprising a body 111, a forced member 112, a light-emitting unit 120, and a pressure detecting unit 130. The forced member 112 is connected to the body 111. The pressure detecting unit 130 is configured to detect pressure of the forced member 112 and send a control signal. The light-emitting unit 120 is disposed in the body 111 and is electrically connected to the pressure detecting unit 130. The light-emitting unit 120 is configured to receive the control signal and generates light, which is emitted from the forced member 112. The touch generator 100 according to the embodiment of the present disclosure is applied to a display panel 200 provided with a photosensitive unit 210, and the photosensitive unit 210 can sense the light emitted by the touch generator 100, thereby realizing optical touch.

The touch generator 100 according to the embodiment of the present disclosure detects force condition of the forced member 112 through the pressure detecting unit 130. When the forced member 112 touches the display panel 200, the pressure detecting unit 130 detects a force of the forced member 112, the light-emitting unit 120 generates light, which is emitted from the forced member 112 to the display panel 200. As a result, the touch generator 100 can emit light only when the touch generator 100 is in contact with the display panel 200, and the photosensitive unit 210 senses the light, thereby realizing the optical touch. However, when the touch generator 100 is not in contact with the display panel 200, the touch generator 100 does not emit light, and the photosensitive unit 210 cannot sense light, which can prevent false touch and is easy to operate, thereby greatly reduces difficulty of using the touch generator 100.

In the embodiment of the present disclosure, a light spot and/or intensity of the light emitted from the forced member 112 is adjusted according to a pressure value of the forced member 112 detected by the pressure detecting unit 130, so that the pressure value of the forced member 112 is presented through optical characteristics of the light. The display panel 200 may convert the optical characteristics of the light received by the photosensitive unit 210 into a pressure sensitivity level.

Specifically, in the embodiment of the present disclosure, the light-emitting unit 120 may comprise at least one light source, and the pressure detecting unit 130 detects the force of the forced member 112, and the light source generates light. In this embodiment, one, two, three, or more light sources may be provided, and specific number of the light sources may be adjusted according to actual situations, which is not uniquely limited here.

Specifically, in the embodiment of the present disclosure, the light source may be a laser generator, and an intensity of light generated by the laser generator is relatively high, which helps to ensure sensitivity and accuracy of touch. It should be understood that specific selection of the light source may be appropriately modified according to actual situations and specific requirements. For example, the light source may also be a light-emitting diode (LED), as long as the light source can generate and transmit light, which is not uniquely limited here.

Further, as shown in FIG. 1, the touch generator 100 further comprise a light guide member 140 provided in the body 111. The forced member 112 is provided with a light outlet 1121. Specifically, the light outlet 1121 is defined at one end of the forced member 112 away from the body 111, and the light guide member 140 is located between the light-emitting unit 120 and the light outlet 1121. In this configuration, the light guide member 140 is arranged in a light propagation path, and light passes through the light guide member 140 and is emitted from the forced member 112. The light guide member 140 can serve as a light guide, which effectively improves utilization rate of light, and makes the light emitted from the light source more uniform.

As shown in FIG. 1, the light guide member 140 extends along a length direction of the body 111. The light guide member 140 has a light incident surface, a light-emitting surface, and a side surface. The light incident surface and the light-emitting surface are arranged opposed to each other, and the side surface is disposed between the light incident surface and the light-emitting surface, the light incident surface is connected to the side surface, and the light-emitting surface is connected to the side surface, the light incident surface is disposed towards the light-emitting unit 120, and the light-emitting surface is disposed towards the force member 112. In this configuration, the light emitted by the light-emitting unit 120 enters an interior of the light guide member 140 from the light incident surface, passes through the light guide member 140, and finally exits from the light-emitting surface.

Specifically, the side surface of the light guide member 140 may be provided with a reflective material so that the side surface of the light guide member 140 can reflect light. In this configuration, when the light is transmitted inside the light guide member 140, part of the light is directed toward the side surface of the light guide member 140 and reflected by the side surface of the light guide member 140. The part of the light can then return to the interior of the light guide member 140 and finally emit from the light-emitting surface of the light guide member 140, thereby ensuring the utilization rate of light.

Further, as shown in FIG. 1, the touch generator 100 further comprises a lens 150 disposed between the light guide member 140 and the light outlet 1121. In this configuration, the lens 150 is provided in the light propagation path, and the light is emitted from the forced member 112 after passing through the lens 150. The lens 150 can focus the light and improve the accuracy of light propagation.

Specifically, as shown in FIG. 1, the lens 150 is disposed in the forced member 112, and the touch generator 100 further comprises an elastic member 160 disposed in the body 111. The elastic member 160 may be, but is not limited to, a spring. One end of the elastic member 160 is connected to the body 111, and another end of the elastic member 160 is connected to the forced member 112. In this configuration, the forced member 112 can be telescopically disposed on the body 111, and the elastic member 160 connects the body 111 and the forced member 112. When the elastic member 160 is in a compressed state, the forced member 112 retracts in the body 111; and when the elastic member 160 is in a natural or an extended state, the forced member 112 protrudes from the body 111. When the forced member 112 of the touch generator 100 is pressed against the display panel 200, the forced member 112 drives the lens 150 to move towards a direction of the light-emitting unit 120, thereby changing a distance between the lens 150 and the light-emitting unit 120, and changing the light spot and intensity of the light emitted from the forced member 112.

Specifically, as shown in FIG. 1, a first fixed step 1111 is disposed in the body 111, and a second fixed step 1122 is disposed on the forced member 112. One end of the elastic member 160 abuts against the first fixed step 1111, and another end of the elastic member 160 abuts against the second fixed step 1122, so that the forced member 112 is telescopically disposed on the body 111.

Specifically, as shown in FIG. 1, the light guide member 140 is disposed on the first fixed step 1111, and both the first fixed step 1111 and the second fixed step 1122 are annular so that light can be emitted from the light outlet 1121.

Specifically, as shown in FIG. 1, the pressure detecting unit 130 is disposed on the first fixed step 1111, and is connected to the elastic member 160, so that the pressure detecting unit 130 can detect an elastic force of the elastic member 160 and obtain the pressure of the forced member 112.

Specifically, as shown in FIG. 1, the touch generator 100 further comprises a communication module 170 electrically connected to the pressure detecting unit 130, and the communication module 170 is configured to communicate with an external device. In this configuration, when the pressure detecting unit 130 detects the pressure of the forced member 112, an encoded signal of the pressure value may be transmitted, and the communication module 170 transmits the encoded signal to the display panel 200.

Specifically, as shown in FIG. 1, the touch generator 100 further comprises a mechanical switch 180 electrically connected to the light-emitting unit 120. The light-emitting unit 120 can be kept in a light-emitting state or a turned-off state by the mechanical switch 180. When the mechanical switch 180 keeps the light-emitting unit 120 in the light-emitting state, the touch generator 100 is used for remote touch. When the mechanical switch 180 makes the light-emitting unit 120 in the turned-off state, the light-emitting unit 120 can be made to emit light by pressing the forced member 112.

Figure 2:
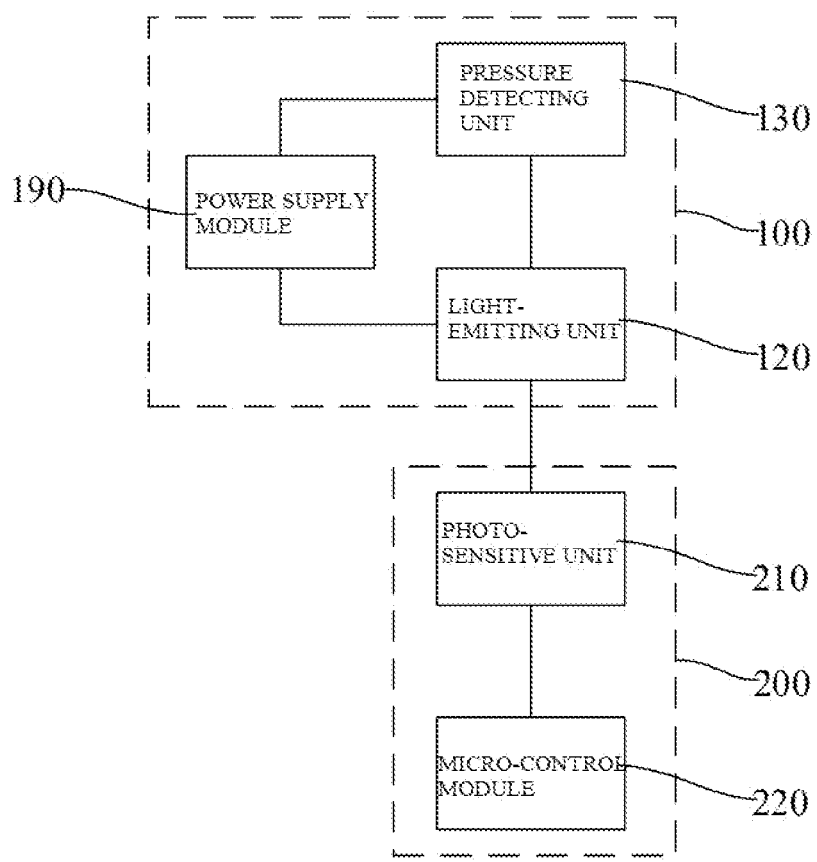
FIG. 2 is a diagram of an operating principle of an optical touch system according to an embodiment of the present disclosure.
Figure 3:
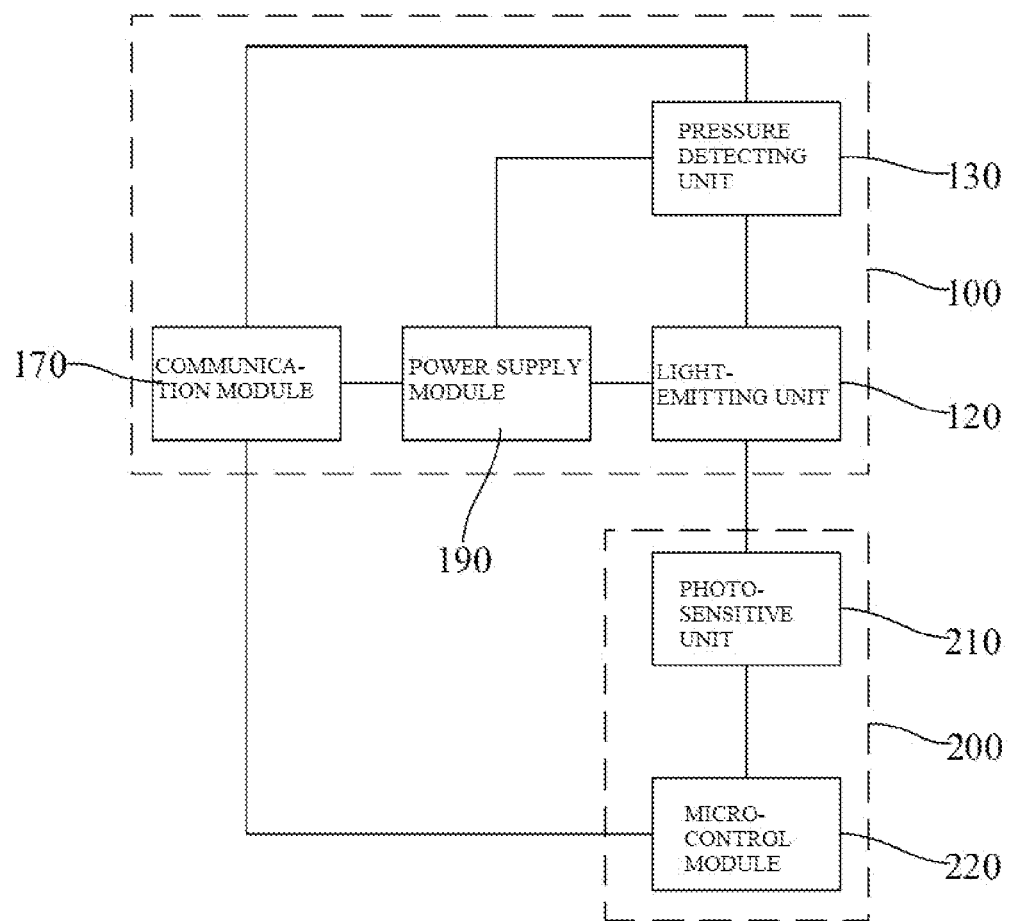
FIG. 3 is a diagram of another operating principle of an optical touch system according to an embodiment of the present disclosure.

Specifically, as shown in FIGS. 1 to 3, the touch generator 100 further comprises a power supply module 190 disposed in the body 111 for supplying electric energy to the touch generator 100. The power supply module 190 is electrically connected to the pressure detecting unit 130, the light-emitting unit 120, and the communication module 170.

Referring to FIG. 1, an embodiment of the present disclosure further provides an optical touch system comprising the touch generator 100 and the display panel 200 provided with the photosensitive unit 210 for sensing light and converting the light into an electrical signal as described above.

In the optical touch system according to the embodiment of the present disclosure, by pressing the forced member 112 of the touch generator 100 on the display panel 200, the pressure detecting unit 130 detects a force of the forced member 112, the light-emitting unit 120 generates light, the light is emitted from the forced member 112 to the display panel 200, and the photosensitive unit 210 senses the light, thereby realizing close optical touch. Certainly, the light-emitting unit 120 can generate light through the mechanical switch 180 according to selection and specific requirements of actual situations, and the light is emitted from the forced member 112 to the display panel 200, and the photosensitive unit 210 senses the light so as to achieve remote optical touch.

Specifically, the photosensitive unit 210 may be disposed on a light-emitting side of the display panel 200, that is, after the display panel 200 is manufactured, the photosensitive unit 210 is provided on the light-emitting side of the display panel 200, and is electrically connected to the display panel 200. Certainly, the photosensitive unit 210 may be integrated into the display panel 200 according to selection and specific requirements of actual situations. Specifically, the photosensitive unit 210 may be integrated into an array substrate of the display panel 200, and the photosensitive unit 210 may also perform a function of sensing light, which is not uniquely limited here.

Specifically, as shown in FIG. 1, the photosensitive unit 210 comprises a plurality of photosensitive elements 211 for receiving light and converting the light into an electrical signal, and the plurality of photosensitive elements 211 are distributed in an array so that the light emitted by the touch generator 100 can be detected.

Specifically, in the embodiment of the present disclosure, the photosensitive element 211 may be specifically a photodiode capable of converting light into an electrical signal, wherein the electrical signal may be a current or a voltage. The photodiode is very sensitive to changes in light, has unidirectional conductivity, and when intensities of light are different, intensities of electrical signals converted by the photodiode are different. Therefore, the present embodiment of the present disclosure can improve the accuracy of touch by changing intensities of light, for example, a position of the photosensitive element 211 receiving light with a highest intensity can be set to a touch position. It will be understood that the photosensitive element 211 may also be another device capable of sensing light, depending on selection and specific requirements of actual situations, and is not uniquely limited here.

The photosensitive element 211 may be an external optical sensor disposed on the display panel 200, or the photosensitive element 211 may be integrated and disposed inside the display panel 200, and may be disposed according to actual requirements.

Specifically, as shown in FIGS. 1 to 3, the display panel 200 further comprises a micro-control module 220 for receiving the electrical signal sent by the photosensitive unit 210 and parsing out touch data. Specifically, the touch data may comprise the pressure sensitivity level and the touch position, and the micro-control module 220 obtains the pressure sensitivity level and the touch position by calculation according to the electrical signal. After the micro-control module 220 parses out the touch data, the micro-control module 220 reacts to the touch data and displays on the display panel 200, thereby displaying a touch point or a touch trace on the display panel 200.

It can be understood that the micro-control module 220 is further configured to receive an encoded signal sent by the pressure detecting unit 130 according to selection and specific requirements of actual situations. Specifically, the micro-control module 220 is communicatively connected to the communication module. When the pressure detecting unit 130 detects the pressure of the forced member 112, the micro-control module 220 may send an encoded signal of the pressure value, and the communication module 170 sends the encoded signal to the micro-control module 220. The micro-control module 220 receives the encoded signal and the electrical signal, and parses out the touch data according to the encoded signal and the electrical signal, wherein the touch data includes the pressure sensitivity level and the touch position. The micro-control module 220 may decode the encoded signal to obtain the pressure sensitivity level, and the micro-control module 220 may calculate the electrical signal to obtain the touch position.

Figure 4:
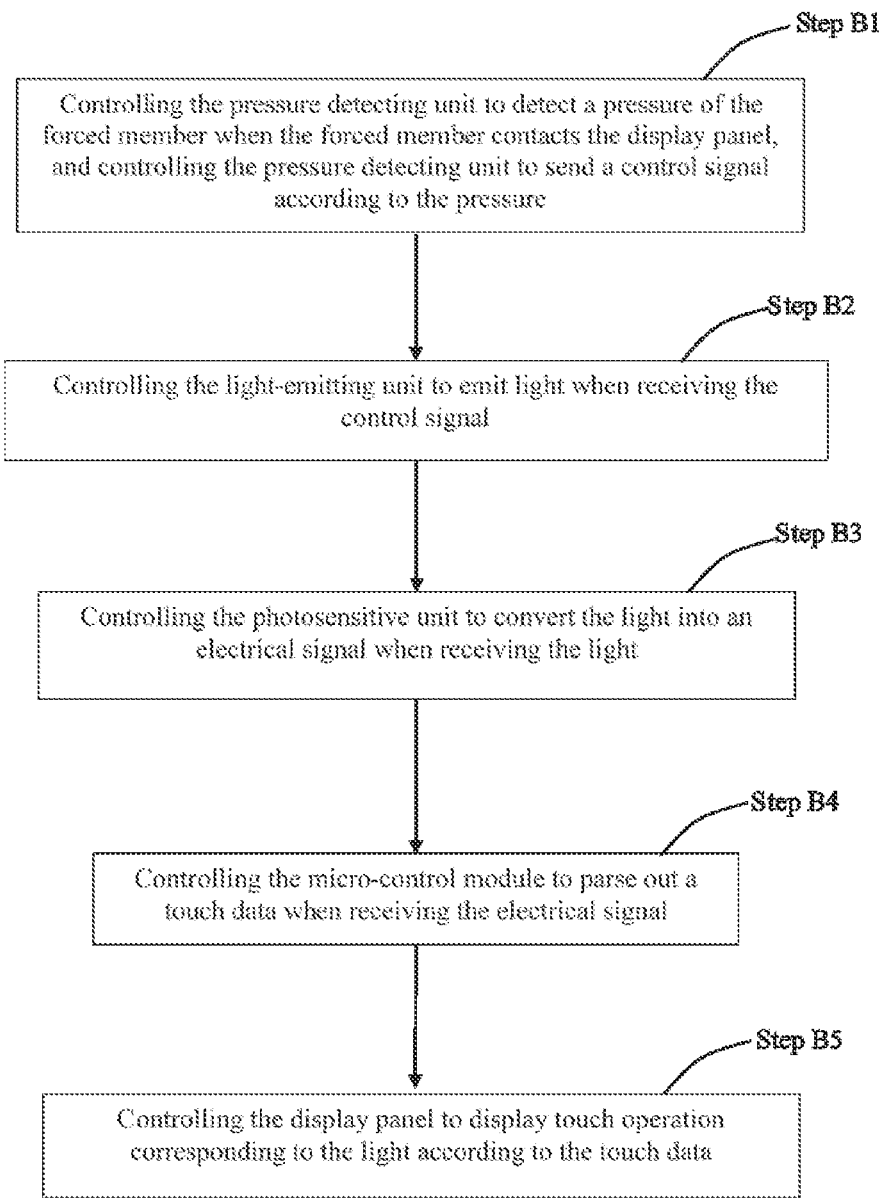
FIG. 4 is a first flowchart of a touch method according to an embodiment of the present disclosure.

Referring to FIGS. 1, 2 and 4, an embodiment of the present disclosure further provides a touch method adopting the optical touch system described above. The touch method includes following steps:

Step B3, controlling a photosensitive unit 210 to convert light into an electrical signal when receiving the light;

Step B4, controlling a micro-control module 220 to parse out a touch data when receiving the electrical signal;

Step B5, controlling the display panel 200 to display touch operation corresponding to the light according to the touch data, wherein the touch operation refers to positioning and tracking movement track of the touch generator 100 according to the touch data, and the movement track of the touch generator 100 can be displayed on the display panel 200, thereby realizing functions such as painting, writing, and interaction.

In the touch method according to the embodiment of the present disclosure, the pressure detecting unit 130 detects force condition of the forced member 112. When the forced member 112 touches the display panel 200, the pressure detecting unit 130 detects the force of the forced member 112 and sends a control signal, the light-emitting unit 120 receives the control signal and emits light, and the light is emitted from the forced member 112 to the display panel 200. The photosensitive unit 210 of the display panel 200 receives the light and converts the light into an electrical signal, the micro-control module 220 receives the electrical signal and parses out the touch data, thereby achieving optical touch.

Alternatively, in the step B4 of the embodiment of the present disclosure, the touch data may specifically include the touch position and the pressure sensitivity level. Of course, the touch data may also include other data according to selection and specific requirements of actual situations, which is not uniquely limited here.

Figure 9:
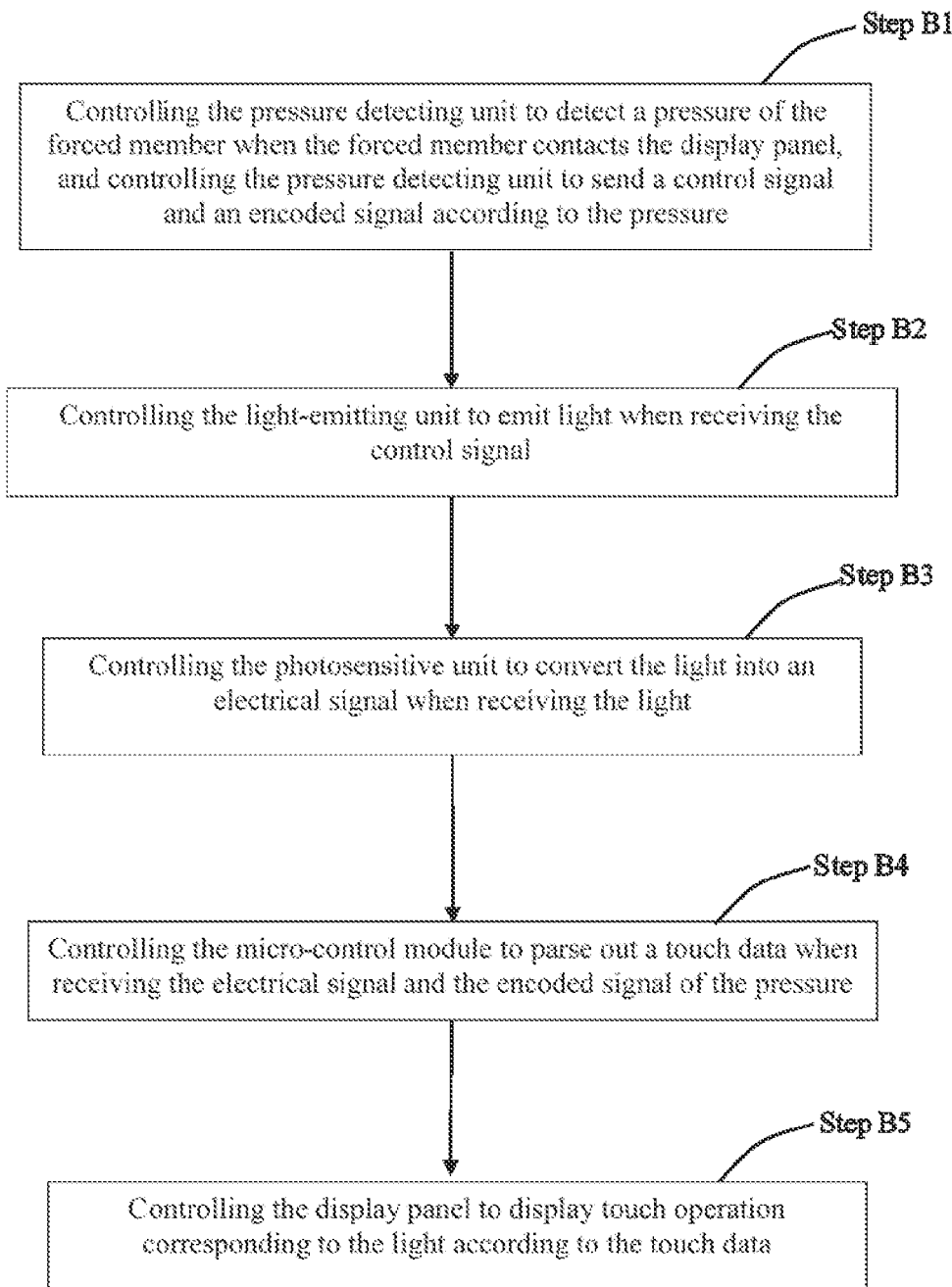
FIG. 9 is a second flowchart of a touch method according to an embodiment of the present disclosure.

Specifically, as shown in FIGS. 4 and 9, before the above step B3, the touch method further includes following steps:

Step B1, controlling a pressure detecting unit 130 to detect a pressure of a forced member 112 when the forced member 112 contacts a display panel 200, and controlling the pressure detecting unit 130 to send a control signal according to the pressure.

Step B2, controlling a light-emitting unit 120 to emit light when receiving the control signal.

Specifically, as shown in FIGS. 1 and 2, in the above-described step B1, the light emitted by the light-emitting unit 120 is emitted after being processed by the light guide member 140. In this configuration, the light guide member 140 can play a light guiding role, thereby effectively improving the utilization rate of light.

Specifically, as shown in FIGS. 1 and 2, in the above-described step B2, the lens 150 is disposed in the light propagation path, and the light is transmitted from the lens 150 after being processed by the light guide member 140, so that the lens 150 can focus the light and improve the accuracy of light propagation.

As shown in FIGS. 1 and 2, after passing through the light guide member 140 and the lens 150, the light reaches the photosensitive unit 210 and is received. The photosensitive unit 210 converts the received light into an electrical signal for transmission. If intensities of lights are different, intensities of corresponding electrical signals are different. Similarly, the micro-control module 220 receives electrical signals of different intensities, and parsed touch data obtained may be different. Therefore, in this embodiment of the present disclosure, the accuracy of touch may be improved by changing the intensity of light. For example, a position where light with a highest intensity is received by the display panel 200 may be set to the touch position.

Specifically, as shown in FIGS. 1 and 2, in the above-described step B2, the intensity of light varies with the control signal, and the control signal is generated according to the pressure, that is, the intensity of light varies according to an intensity of the pressure.

Alternatively, the intensity of light can be adjusted and changed by changing a current of the light-emitting unit 120. In this embodiment, if the pressure on the forced member 112 is small, the current of the light-emitting unit 120 is small under a control of the control signal, and accordingly, the light-emitting unit 120 emits light of low intensity; and if the pressure on the forced member 112 is large, the current of the light-emitting unit 120 is large under control of the control signal, and accordingly, the light-emitting unit 120 emits light of high intensity.

As shown in FIGS. 1 and 2, after the light reaches the display panel 200, the photosensitive unit 210 receives the light, and an area of the photosensitive unit 210 receiving the light varies depending on a size of a light spot, that is, the size of the light spot also affects sensing condition of the photosensitive unit 210. In the embodiment of the present disclosure, the light spot can be changed with the intensity of the pressure, and therefore the pressure applied to the forced member 112 can be calculated according to the size of the light spot, and presented on the display panel 200 by a width of handwriting. Specifically, the area of the photosensitive unit 210 receiving the light is a spot area. When the light spot is large, the area of the photosensitive unit 210 receiving the light is also large. When the light spot is small, the area of the photosensitive unit 210 receiving the light is also small.

Alternatively, a degree of focusing of the light may be changed by changing a distance between the light-emitting unit 120 and the lens 150, thereby changing the size of the light spot on the photosensitive unit 210. In this embodiment, as shown in FIG. 1, if the pressure applied to the forced member 112 is small, the distance between the light-emitting unit 120 and the lens 150 is large, and if the pressure applied to the forced member 112 is large, the distance between the light-emitting unit 120 and the lens 150 is small, so that the size of the light spot can be changed.

Specifically, as shown in FIGS. 1 and 2, the photosensitive unit 210 comprises the plurality of photosensitive elements 211. In the above-described step B3, the step of controlling the photosensitive unit 210 to convert the light into the electrical signal when receiving the light includes controlling one or more photosensitive elements 211 to convert corresponding light into the electrical signal when receiving the light.

Specifically, in the embodiment of the present disclosure, the photosensitive element 211 may be specifically a photodiode capable of converting light into an electrical signal, wherein the electrical signal may be a current or a voltage. The photodiode is very sensitive to changes in light, has unidirectional conductivity, and when intensities of light are different, intensities of electrical signals converted by the photodiode are different. Therefore, the embodiment of the present disclosure can improve the accuracy of touch by changing the intensity of light, for example, a position of the photosensitive element 211 on the display panel 200 receiving light with the greatest intensity can be set to the touch position. It will be understood that the photosensitive element 211 may also be another device capable of sensing light, depending on selection and specific requirements of actual situations, and is not uniquely limited here.

Figure 5:
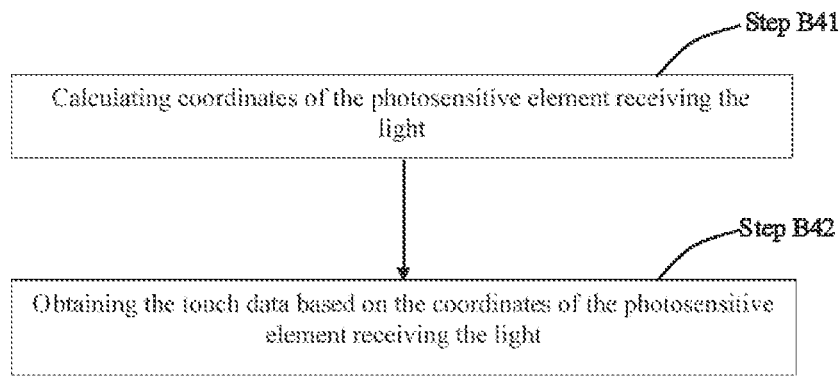
FIG. 5 is a first flowchart of step B4 of a touch method according to an embodiment of the present disclosure.

Specifically, as shown in FIG. 5, in the above step B4, the step of controlling the micro-control module 220 to parse out the touch data when receiving the electrical signal includes:

Step B41, calculating coordinates of a photosensitive element 211 receiving the light;

Step B42, obtaining the touch data based on the coordinates of the photosensitive element 211 receiving the light.

Figure 6:
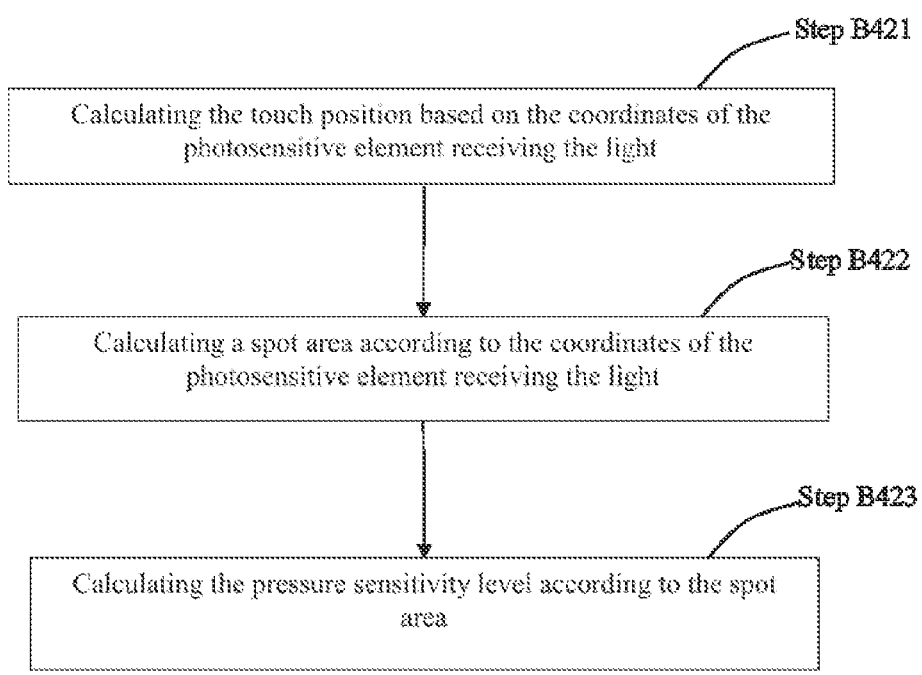
FIG. 6 is a flowchart of step B42 of a touch method according to an embodiment of the present disclosure.

Specifically, as shown in FIG. 6, in the above step B42, the touch data includes the touch position, and the step of obtaining the touch data according to the coordinates of the photosensitive element 211 receiving the light specifically includes:

Step B421, calculating the touch position based on the coordinates of the photosensitive element 211 receiving the light. Specifically, when there is only one photosensitive element 211 that receives the light, the coordinates of the photosensitive element 211 receiving the light are the touch position. When there are a plurality of photosensitive elements 211 that receive the light, a center point of coordinates of the plurality of photosensitive elements 211 that receive the light is the touch position. Alternatively, an area between the coordinates of the plurality of photosensitive elements 211 that receive the light is the touch position.

Specifically, as shown in FIG. 6, in the above step B42, the touch data further includes the pressure sensitivity level, and the step of obtaining the touch data according to the coordinates of the photosensitive element 211 receiving the light specifically includes:

Step B422, calculating a spot area according to the coordinates of the photosensitive element 211 receiving the light;

Step B423, calculating the pressure sensitivity level according to the spot area. In this embodiment, the pressure sensitivity level corresponding to the spot area is acquired in a first relationship mapping table, wherein the first relationship mapping table is a mapping relationship between the spot area and the pressure sensitivity level. In the first relationship mapping table, one spot area may correspond to one pressure sensitivity level, or a plurality of spot areas may correspond to one pressure sensitivity level.

Figure 7:
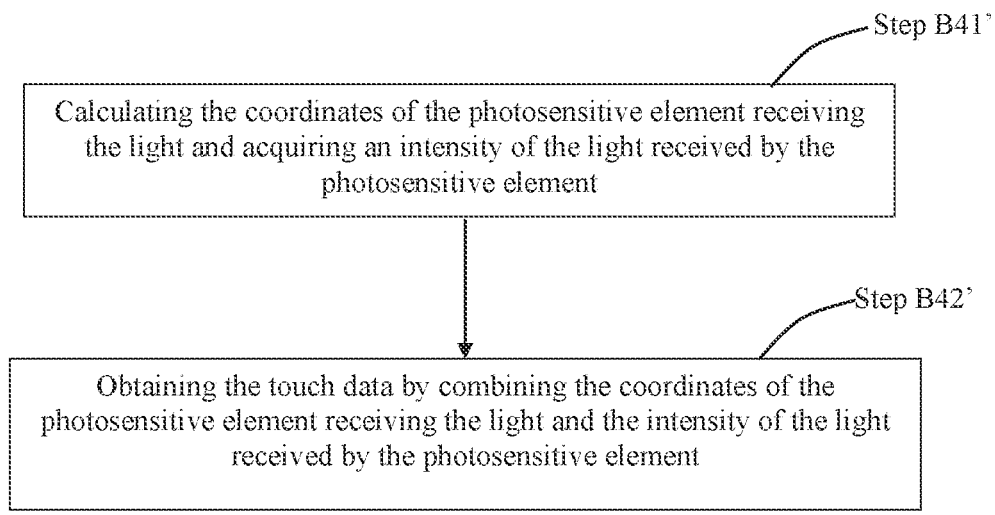
FIG. 7 is a second flowchart of step B4 of a touch method according to an embodiment of the present disclosure.

Specifically, as shown in FIG. 7, in the above step B4, the step of controlling the micro-control module 220 to parse out the touch data when receiving the electrical signal includes:

Step B41', calculating the coordinates of the photosensitive element 211 receiving the light and acquiring an intensity of the light received by the photosensitive element 211, wherein the coordinates of the photosensitive element 211 receiving the light and the intensity of the light received by the photosensitive element 211 correspond one-to-one;

Step B42', obtaining the touch data by combining the coordinates of the photosensitive element 211 receiving the light and the intensity of the light received by the photosensitive element 211. In this embodiment, the touch data is obtained by combining the coordinates of the photosensitive element 211 receiving the light and the intensity of the light received by the photosensitive element 211, and the accuracy of touch can be improved.

It should be noted that in the above step B41', the photosensitive element 211 can convert the light into electrical signals, which may be a current or a voltage, and when intensities of light are different, intensities of converted electrical signals are different. Therefore, the intensity of the light received by the photosensitive element 211 can be obtained inversely according to the electrical signal received by the micro-control module 220.

Figure 8:
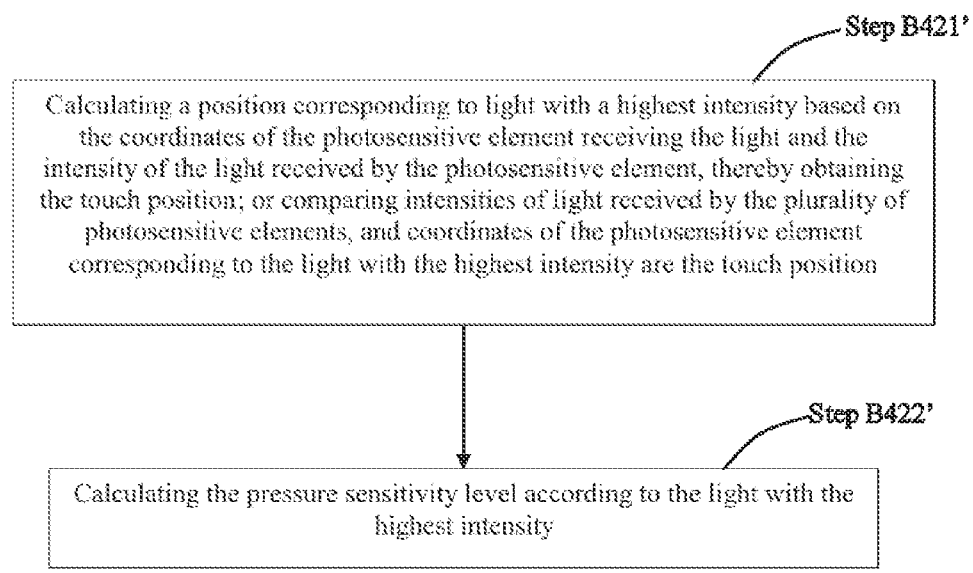
FIG. 8 is a flowchart of Step B42' of a touch method according to an embodiment of the present disclosure.

Specifically, as shown in FIG. 8, in the above step B42', the touch data includes the touch position, and the step of obtaining the touch data by combining the coordinates of the photosensitive element 211 receiving the light and the intensity of the light received by the photosensitive element 211 specifically includes:

Step B421', calculating a position corresponding to light with a highest intensity based on the coordinates of the photosensitive element 211 receiving the light and the intensity of the light received by the photosensitive element 211, thereby obtaining the touch position; or, comparing intensities of light received by the plurality of photosensitive elements 211, and coordinates of the photosensitive element 211 corresponding to the light with the highest intensity are the touch position.

Specifically, as shown in FIG. 8, in the above step B42', the touch position further includes the pressure sensitivity level, and the step of obtaining the touch data by combining the coordinates of the photosensitive element 211 receiving the light and the intensity of the light received by the photosensitive element 211 specifically includes:

Step B422', calculating a pressure sensitivity level according to the light with the highest intensity. In this embodiment, the pressure sensitivity level corresponding to the light with the highest intensity is acquired in a second relationship mapping table, wherein the second relationship mapping table is a mapping relationship between the light intensity and the pressure sensitivity level. In the second relationship mapping table, an intensity of light may correspond to a pressure sensitivity level, or a plurality of intensities of light may correspond to a pressure sensitivity level.

Specifically, in the above-described embodiment, the pressure sensitivity level may be obtained without an electrical signal. Specifically, as shown in FIGS. 3 and 9, in the above-described step B1, the pressure detecting unit 130 is controlled to detect the pressure of the forced member 112 when the forced member 112 contacts the display panel 200, and the pressure detecting unit 130 is controlled to send the control signal and the encoded signal according to the pressure, wherein the encoded signal is a signal carrying the pressure sensitivity level information. In the above step B4, the micro-control module 220 is controlled to parse out the touch data when receiving the electrical signal and the encoded signal of the pressure. In this embodiment, the pressure detecting unit 130 sends the encoded signal to the micro-control module 220 through the communication module 170. The touch data includes the touch position and the pressure sensitivity level. The micro-control module 220 calculates the pressure sensitivity level according to the encoded signal, the micro-control module 220 calculates the touch position according to the electrical signal, and the micro-control module 220 calculating the touch position according to the electrical signal can use the method of the above-described embodiment.

The touch generator, the optical touch system, and the touch method provided in the embodiments of the present disclosure are described in detail above. Principles and embodiments of the present disclosure are described by using specific examples herein. The description of the embodiments is merely intended to help understand the methods and core ideas of the present disclosure. At the same time, those skilled in the art may make changes in the specific embodiments and application scope according to the idea of the present disclosure. In conclusion, the content of the specification should not be construed as a limitation to the present disclosure.

What is claimed is:

1. A touch method, wherein the touch method comprises following steps:
controlling a plurality of photosensitive elements to convert light into an electrical signal when receiving the light;
controlling a micro-control module to calculate coordinates of the photosensitive elements when receiving the electrical signal;
controlling the micro-control module to obtain touch data according to the coordinates of the photosensitive elements, the touch data comprising a touch position, and the touch position being a center point of the coordinates of the photosensitive elements; and
controlling a display panel to display a touch operation corresponding to the light according to the touch data.

2. The touch method according to claim 1, wherein the touch data further comprises a pressure sensitivity level, and the step of controlling the micro-control module to obtain the touch data according to the coordinates of the photosensitive elements further comprises:

controlling the micro-control module to calculate a spot area according to the coordinates of the photosensitive elements; and controlling the micro-control module to calculate the pressure sensitivity level according to the spot area.

3. The touch method according to claim 1, wherein the step of controlling the micro-control module to calculate the coordinates of the photosensitive elements when receiving the electrical signal comprises the micro-control module calculating the coordinates of the photosensitive elements when receiving the electrical signal and an encoded signal of a pressure.

* * * * *